United States Patent [19]

Knuth

[11] 3,946,778
[45] Mar. 30, 1976

[54] REMOVABLE CUTTING MECHANISM

[76] Inventor: Eugene W. Knuth, Land O Lakes, Wis. 54540

[22] Filed: Feb. 10, 1975

[21] Appl. No.: 548,589

[52] U.S. Cl................ 145/31 A; 30/166 R; 30/349
[51] Int. Cl.² ......................................... B27B 21/00
[58] Field of Search......... 30/166 R, 349; 145/31 R, 145/31 A

[56] References Cited
UNITED STATES PATENTS

| | | | |
|---|---|---|---|
| 1,712,008 | 5/1929 | Rice | 145/31 AD |
| 1,956,588 | 5/1934 | Parker et al. | 30/349 X |
| 2,403,027 | 7/1946 | Shoultz | 145/31 R |

Primary Examiner—Al Lawrence Smith
Assistant Examiner—J. T. Zatarga
Attorney, Agent, or Firm—Edwin E. Greigg

[57] ABSTRACT

Apparatus is described for the fastening of two or more planar structures. Specifically described is a saw which has a removable cutting edge and handle. The cutting edge fastening means includes mating chamfered surfaces as well as tensioned pin-in-slot retainers. The handle is retained by a pin-in-slot constraint coupled with having a saw handle groove tightly accommodate the saw body edge.

This invention relates generally to improvements in joining together substantially rigid coplanar bodies, and more particularly to providing a saw with an improved removable blade and handle.

4 Claims, 6 Drawing Figures

REMOVABLE CUTTING MECHANISM

BACKGROUND OF THE INVENTION

Hand saws have frequently been cumbersome to store, bothersome to sharpen, difficult to use in places where space restrictions are critical, and slow to cut with because the space between teeth is so shallow that frequently the saw is riding on the layer of sawdust which builds up between the teeth, thereby causing the blade to lose the maximum "bite" of which it is capable.

OBJECTS AND SUMMARY OF THE INVENTION

Accordingly, one object of the invention is to provide a sawing surface having superior sawing characteristics over blades of the prior art.

Another object of the invention is to provide a saw which is easily capable of being disassembled without the need for special tools to provide more efficient use of space in the storage of the saw. A further object is to provide a saw whose sharpness can easily be maintained.

Briefly, the invention comprises a saw structure which can be disassembled without the need for special tools for easy storage, and includes an easily removable saw edge so that a dull blade or dull parts thereof can be replaced with minimal time loss. Further, the handle can be oriented relative to the saw body many different ways to provide flexibility when sawing in restricted areas. The cutting edge is fashioned in such a way that more teeth per unit length are provided while improving the efficient removal of the sawdust.

BRIEF DESCRIPTION OF THE DRAWING

Other objects and advantages will become apparent from the following detailed description of the preferred embodiment illustrated in the accompanying drawing in which:

Referring to FIG. 1, there is shown a saw body 14 having a removable saw edge generally defined by numerals 2, 5 and 6 and an edge guard 10. The saw handle 8 is affixed to the blade 14 by inserting the body 14 into slot 22 of FIG. 5 until the blade is tangent to cushioning member 12 and aligning one of the holes 9 with the corresponding hole 21 of handle 8. A pin 7 is used to retain the blade in the handle, and lock washers 11 firmly affix pin 7 to the handle 8. In this way there is a tight connection between the handle and blade but they are easy to separate, as well as readjust to provide an offset between the two bodies if the nature of the work requires same.

FIG. 2 shows the saw edge in which the two segments 5 and 6 are laminated together by any method well known in the art (welding, cementing, etc.). The two segments are oriented so that the tip of one tooth of one segment falls substantially medially of the tips of two teeth of the other segment. Such an arrangement provides more teeth per unit length than other arrangements and further provides greater gullet depth at 24 to provide efficient sawdust removal. The saw edge is retained to the saw body 14 by the spring strips 2 which terminate in pins 23. Pins 23 ride snugly in the apertures 1 of saw body 14 and tend to retard edge deflection not only in the direction of the sawing but also at right angles thereto. The resilient strips tightly engage the apertures as shown at 30. A lug 32 on the recess of the body, and a notch 33 in the chamfered edge of the segment acts to take up thrust and assists in properly positioning the segments.

FIGS. 3 and 4 show additional anti-deflection means as well as another view of pin retainer 23. Specifically, FIG. 4 shows the chamfered fit between the saw edge and body 14 defined by numerals 15 through 20. The saw body is milled or otherwise cut away adjacent its upper edge to provide a longitudinal recess or rabbet 17. The upper edge of the body section is beveled at 16 and the shoulder formed by the rabbet 17 is undercut to form a groove 20. The opposed face portion of the saw edge is similarly chamfered to provide a tight interlock between the two bodies. As shown in FIG. 4, surfaces 15, 18 and 19 are fashioned to closely mate respective surfaces 16, 17 and 20 of saw body 14, thereby providing further resistance to latitudinal and longitudinal deflection. FIG. 6 shows two contrasting embodiments of the saw edge configuration: the upper saw edge is linear, while the lower one shows an exaggerated view of a blade segment having a curve along the tooth line of the saw edge.

Figure 1:
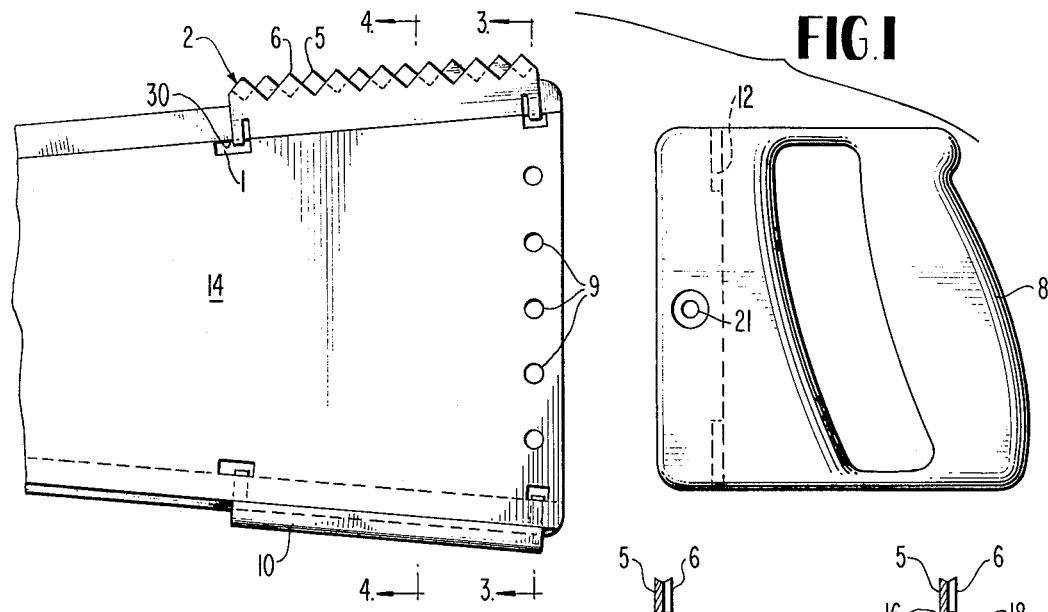
FIG. 1 shows a side view of the saw embodying the features of the invention.
Figure 2:
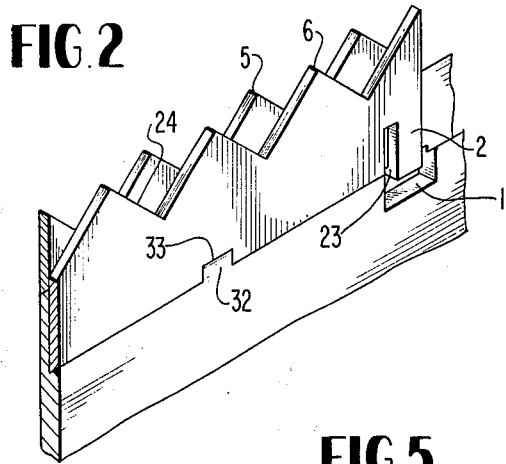
FIG. 2 shows a three-quarter view of the sawing surface.
Figures 3, 4:
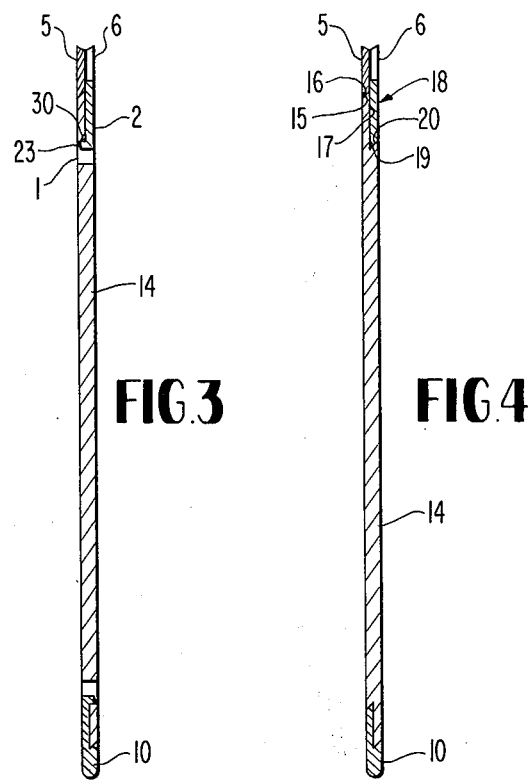
FIGS. 3 and 4 show cross-sections of FIG. 1 taken along lines 3—3 and 4—4 respectively.
Figure 5:
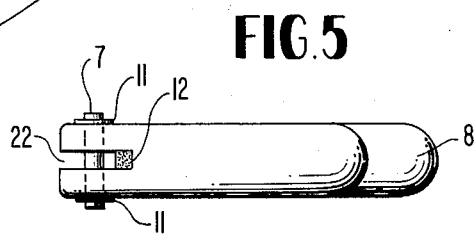
FIG. 5 shows a top view of the saw handle of FIG. 1.
Figure 6:
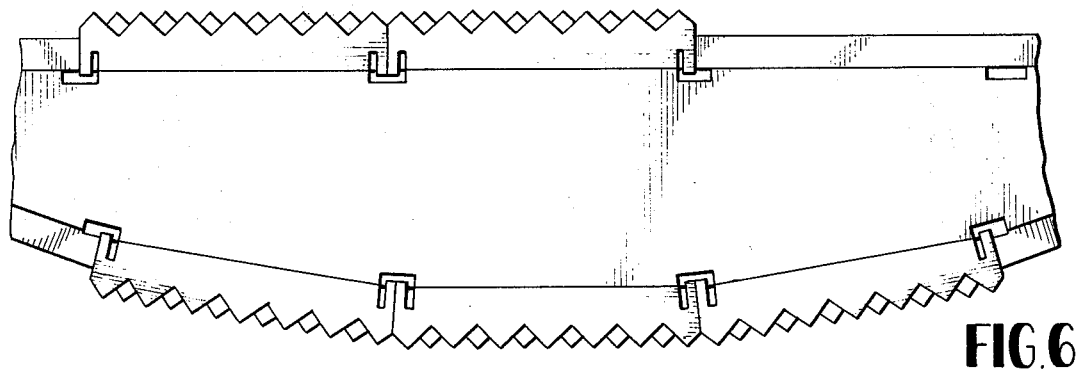
FIG. 6 shows two embodiments of the cutting edge.

What is claimed is:

1. Means for the conjunction of plural substantially rigid planar bodies comprising:
   a first elongated body provided with four edge surfaces, at least one of which is provided with a chamfer, said body being further provided with apertures along its length below said chamfered surface;
   a second elongated body having four edges, the first edge of which has a surface chamfered to mate with the chamfered edge surface of said first body, said second body having resilient strips along its length substantially coplanar with said bodies but perpendicular to said edge surfaces, one end of said resilient strip being firmly affixed above said first edge to said second body, the other end of said resilient strip terminating in a pin which is transverse to said coplanar bodies, said pin being suitably oriented to be inserted in the apertures of the first body, and to tightly engage the upper edge of said aperture.

2. A saw having a removable sawing edge comprising:
   a saw body provided with four edge surfaces, at least one of which is provided with a chamfer, said body being further provided with apertures along its length below said chamfered surface;
   a cutting body having four edges, the first edge of which has a surface chamfered to mate with the chamfered edge surface of said saw body, said cutting body having resilient strips along its length substantially coplanar with said bodies but perpendicular to said edge surfaces, one end of said resilient strip being firmly affixed above said first edge to said cutting body, the other end of said resilient strip terminating in a pin which is transverse to said bodies, said pins being suitably oriented to be inserted in the apertures of the saw body and to tightly engage the upper edge of said aperture.

3. The invention according to claim 2 in which said cutting body comprises two sections defined by the plane which passes through said first and second edge surfaces along their longitudinal midpoints, said sections being laminated along said plane; and said second edge having teeth on both first and second sections which are staggered so that the point of one tooth of said first section falls substantially halfway between two teeth of said second section to form said cutting edge surface.

4. The invention according to claim 2 in which said saw body has a second edge surface which is perpendicular to said first edge surface, said saw body further having a plurality of apertures parallel to said second edge surface and being closely spaced from said second edge surface;

a handle body having at least four edges, one edge of which is provided with a grooved recess to allow insertion of the second edge surface of said saw body therein;

said handle body being further provided with an aperture located approximately halfway up said grooved recess to be aligned with one of the apertures on the second edge of said saw body; and a retention pin suitably disposed to pass through said aligned apertures to provide retention means for said saw and handle bodies; and a rectangular cutaway on said handle body approximately parallel to said edge surface of said handle body to provide a hand grip on said handle body.

* * * * *